United States Patent
Robinson et al.

[19]

[11] Patent Number: 6,066,275

[45] Date of Patent: May 23, 2000

[54] METHOD AND APPARATUS FOR DETERMINING AND CONTROLLING EXCESS LENGTH OF A COMMUNICATIONS ELEMENT IN A CONDUIT

[75] Inventors: Richard T. Robinson, Hickory, N.C.; James J. Puzan, Alpharetta, Ga.

[73] Assignee: Alcatel, Paris, France

[21] Appl. No.: 09/111,423

[22] Filed: Jul. 7, 1998

[51] Int. Cl.[7] .......................... B29C 47/92; B29D 11/00
[52] U.S. Cl. ...................... 264/40.1; 264/1.28; 264/1.29; 264/132; 264/482; 425/113; 425/114; 425/140; 425/174.4; 425/3
[58] Field of Search .................... 264/40.1, 1.28, 264/1.29, 1.24, 132, 482; 425/113, 114, 145, 135, 140, 174.4, 3

[56] References Cited

U.S. PATENT DOCUMENTS

| | | | |
|---|---|---|---|
| 4,154,783 | 5/1979 | Jackson | 264/1.29 |
| 4,585,406 | 4/1986 | Ravela | 264/1.28 |
| 4,772,435 | 9/1988 | Schlaeppi et al. | 264/1.29 |
| 4,814,116 | 3/1989 | Oestreich et al. | 264/1.24 |
| 4,861,525 | 8/1989 | Oestreich | 264/1.29 |
| 5,372,757 | 12/1994 | Schneider | 264/1.28 |

FOREIGN PATENT DOCUMENTS

0484536  12/1995  European Pat. Off. .

*Primary Examiner*—Mathieu D. Vargot
*Attorney, Agent, or Firm*—Ware, Fressola, Van Der Sluys & Adolphson LLP

[57] ABSTRACT

A method and apparatus for determining and controlling the excess length of a communications element disposed in a conduit is disclosed. The method includes the steps of measuring the length of a communications element being disposed within the conduit, placing a mark on the conduit each time a pre-determined length of the communications element is disposed within the conduit, and measuring the distance between the marks on the conduit. The excess length is determined by comparing the distance between the initial mark and the subsequent mark on the conduit to the measured length of the communications element disposed within the conduit. To control the excess length ratio, the conduit may be stretched, or process parameters related to formation of the conduit may be changed.

24 Claims, 4 Drawing Sheets

METHOD AND APPARATUS FOR DETERMINING AND CONTROLLING EXCESS LENGTH OF A COMMUNICATIONS ELEMENT IN A CONDUIT

BACKGROUND OF THE INVENTION

1. Field Of The Invention

The present invention relates generally to the manufacture of a communications cable having one or more communications elements disposed within a conduit. More particularly, the present invention relates to a method and apparatus for determining and controlling the excess length of a communications element, such as an optical fiber or optical fiber ribbon, contained within a conduit, such as a buffer tube.

2. Discussion of Related Art

In some types of optical fiber cables, optical fibers or optical fiber ribbons are disposed within a buffer tube. It is desirable for the length of such communications elements to be longer than the buffer tube to allow a tensile stress to be applied to the buffer tube without imposing stress on the optical fibers. If the optical fibers are not longer than the buffer tube and the cable is placed in tension, which can occur during installation and operation of the cable, the optical fibers can be subjected to a tensile stress and under severe conditions, the optical fibers may break due to the limited amount of strain such fibers can endure. In addition, an increase in the strain on optical fibers can cause attenuation. However, if an excess length of optical fibers is disposed within the buffer tube, application of tensile stress to the buffer tube may cause the fibers to straighten out, but the tensile stress and strain on the fibers is avoided.

The length of optical fiber or optical fiber ribbon which exceeds the length of the buffer tube is typically referred to as "Excess Fiber Length" or "Excess Ribbon Length" as the case may be. The terms "Excess Fiber Length" and "Excess Ribbon Length" are referred to herein collectively as the "Excess Length" or simply "EL." Cable manufacturers also refer to a ratio called "Excess Fiber Length Ratio" or "Excess Ribbon Length Ratio" as the case may be (referred to herein collectively as the "Excess Length Ratio" or "EL Ratio"), which is the number which results from the following equation:

$$EL\ Ratio = \left(\frac{F_L}{T_L} - 1\right) \times 100$$

where $F_L$=Fiber length, and
where $T_L$=Tube length.

While Excess Length and an Excess Length Ratio greater than one (1) is desirable to prevent tensioning the fiber, in some cases the EL and the EL Ratio can be too high resulting in greater signal attenuation due to excess bending of the fiber. Also, as the EL and EL Ratio increases, the amount of fiber used increases, which increases the cost of the cable. Therefore, it is desirable to control the EL within a buffer tube by controlling the EL Ratio.

There are two known methods of determining the EL Ratio, the destructive testing method and the speed or velocity method. In the destructive testing method, the buffer tube and fiber or ribbon residing therein are cut to produce a sample, and the fiber or ribbon is removed from the buffer tube. The lengths of the fiber or ribbon and buffer tube are then measured, and the EL Ratio is calculated.

The destructive testing method has several disadvantages. First, the destructive testing method leads to waste because the sample is destroyed during analysis. Second, the destructive testing method does not provide a realistic means for calculating the EL Ratio at many different points on a buffer tube because the buffer tube is destroyed during testing in order to determine the EL Ratio. Finally, the destructive testing method does not provide a means for controlling the EL Ratio in real time or near real time during the manufacturing process because of the time required to cut and measure the sample.

In the velocity method for determining the EL Ratio, the rate at which the fiber is fed to a buffer tube extruder cross-head and the line velocity of the buffer tube extruded over the fiber are measured. The line velocity and feed rate correlate directly to the buffer tube length and fiber length respectively. The velocity method typically employs two non-contact laser length gauges as sensors to determine the fiber feed rate and buffer tube line velocity. The feed rate and line velocity information are entered into a pre-programmed computer to determine the EL Ratio.

The velocity method has the advantage over the destructive testing method in that there is no destruction of the buffer tube or cable. However, because the buffer tube may shrink or otherwise be altered by the manufacturing process, or subsequent to the manufacturing process, such that the EL Ratio is also altered, the velocity method can not provide a reliable post-extrusion process measure of the EL Ratio of the product. For example, it is well known that while on a reel either prior to a phase of manufacturing the cable or prior to installation of the cable, the buffer tube length may change due to additional post-extrusion shrinkage of the buffer tube material such that the EL Ratio is increased. Therefore, the velocity method does not provide a means for determining or controlling the EL Ratio after the extrusion process.

SUMMARY OF THE INVENTION

Accordingly, it is an object of the present invention to provide a method and an apparatus for determining the EL Ratio of at least one communications element contained within a conduit, such as a buffer tube.

It is another object of the present invention to provide a method and an apparatus for controlling the EL Ratio of at least one communications element contained within a conduit.

The foregoing objects are realized by the methods of the present invention, and apparatus for carrying out the methods. According to the present invention, the method for determining Excess Length begins by continuously feeding a communications element through an extruder cross-head. A conduit is continuously extruded over the communications element. An initial mark is provided on the conduit. A length of the communications element fed into the extruder cross-head is counted commencing when the initial mark is provided on the conduit. When the counted length of the communications element fed into the extruder cross-head reaches a predetermined value, a subsequent mark is provided on the conduit. The distance between the initial mark and the subsequent mark is measured, and the actual Excess Length Ratio is determined by comparing the measured distance between the initial mark and the subsequent mark on the conduit to the counted length of the communications element fed into the extruder cross-head.

The so marked conduit can be used in a method for controlling the EL Ratio of at least one communications element contained within the conduit. In this method a conduit having a leading mark and a trailing mark is provided. The marks represent that a known length of the communications element was disposed in the conduit between the marks. The distance between the leading mark and the trailing mark on the conduit is measured and the actual Excess Length Ratio is determined between the leading and trailing marks on the conduit by comparing the distance between the leading and trailing marks on the conduit to the known length of the communications element fed into the extruder cross-head. The actual Excess Length Ratio is compared to a desired Excess Length Ratio. If the actual Excess Length Ratio is greater than the desired Excess Length Ratio, the conduit is stretched a predetermined amount to obtain the desired Excess Length Ratio.

An apparatus for carrying out the method of determining the EL Ratio described above includes a controller connected to a controller interface having an input and an output. The apparatus also has an extruder with a cross-head. The extruder cross-head continuously extrudes a conduit over a communications element. The communications element enters the extruder cross-head on the feed side of the cross-head and exits the cross-head at the exit side of the cross-head. Upstream of the cross-head is a communications element velocity sensor having an output connected to the input of the controller interface. Down-line of the cross-head is a marker having an input connected to the output of the controller interface. Finally, the apparatus has a mark detector with an output connected to the input of the controller interface and located down-line of the marker.

An apparatus for carrying out the method of controlling the EL Ratio described above includes a controller connected a controller interface having an input and an output. The input of the controller interface is connected to an output of a mark detector. Connected to the output of the controller interface is the input of a tensioner. Alternatively, the output of the controller interface may be connected to devices involved in forming the conduit, for example a cooling trough, a means for measuring the various components of the material extruded and/or a heater which provides the conduit material to the extruder at a predetermined temperature.

Other objects and advantages of the present invention will become apparent to those skilled in the art from the following detailed description read in conjunction with the attached drawings and claims appended hereto.

BRIEF DESCRIPTION OF THE DRAWINGS

For a fuller understanding of the nature and objects of the invention, reference should be made to the following detailed description taken in conjunction with the accompanying drawings in which.

DETAILED DESCRIPTION OF THE INVENTION

Figure 1:
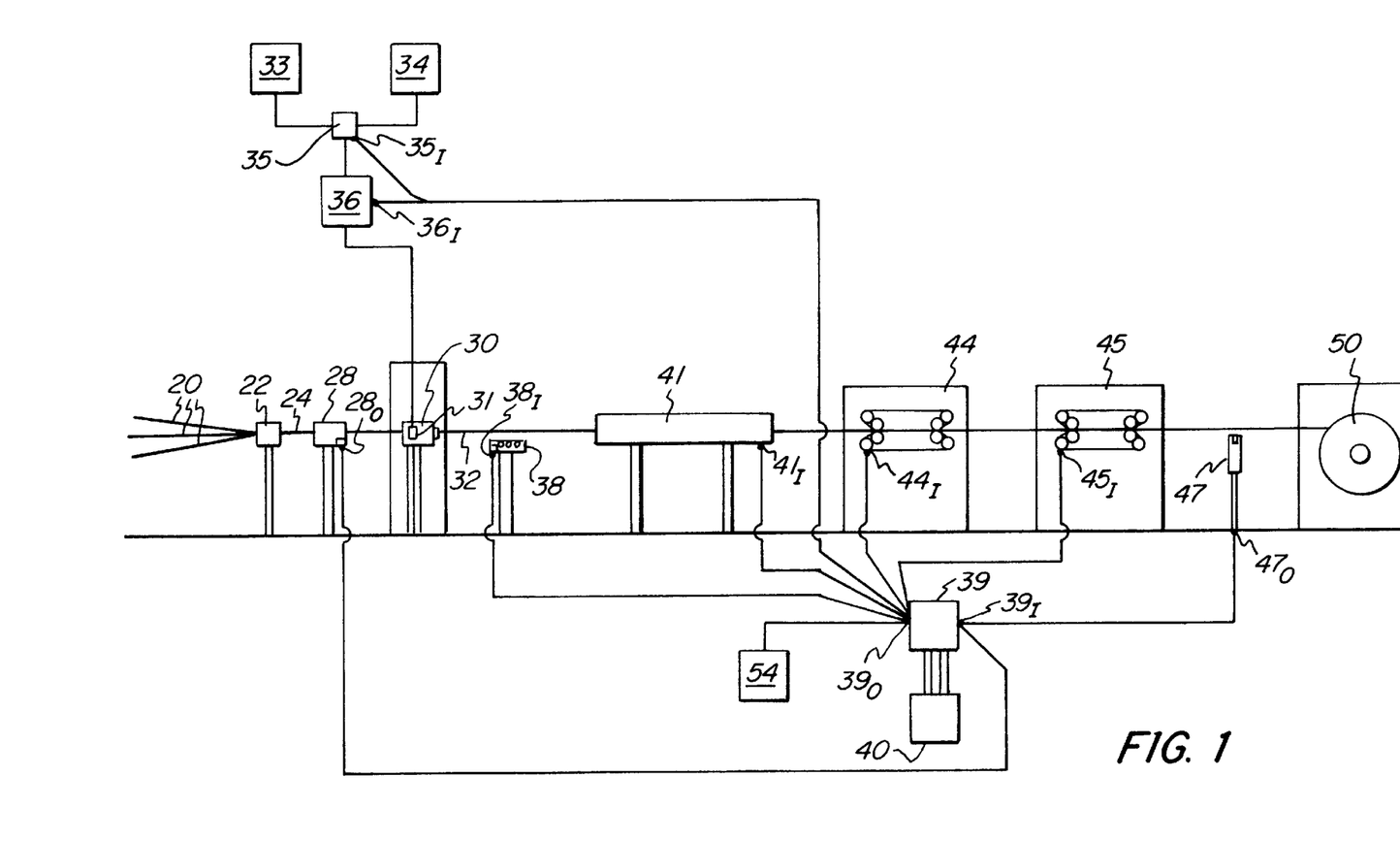
FIG. 1 is a schematic diagram of an apparatus for carrying out a method according to the present invention.

Turning now to the figures, in FIG. 1 there is shown an apparatus for disposing communications elements 20, such as optical fibers or optical fiber ribbons, within a conduit 32, such as a buffer tube. As shown in FIG. 1, communications elements 20 are fed to a guide 22, which groups several communications elements 20 into a bundle 24. The bundle 24 moves through a bundle sensor 28, which sends signals from an output $28_O$ to an input $39_I$ of a controller interface 39, the signals indicating the length or the velocity of the bundle 24 passing into the conduit extruder 30. The controller interface 39 is connected to a controller 40, which may have a central processing unit similar to those found in computers. The conduit extruder 30 has a means for mixing, heating and feeding heated conduit material to the extruder 30, which may comprise conduit component tanks 33, 34, containing the components of the conduit material, mixer-measurer 35, for measuring the proper amount of the components and mixing them together, and heater 36 for heating the conduit material to a predetermined temperature. The extruder 30 has a cross-head 31, for forming a conduit 32 around the bundle 24. At the exit side of the extruder 30 is a marking device 38. The controller interface 39 sends signals from the output $39_O$ to an input $38_I$ of the marking device 38 instructing the marking device 38 to mark the conduit 32, with bundle 24 therein, each time the controller 40 determines that a predetermined length of the bundle 24 has passed into the extruder 30.

Once marked, the conduit 32 passes through a cooling trough 41 to cool and solidify the conduit 32. As the conduit 32 cools it shrinks, thereby making the conduit 32 shorter than the bundle 24 therein, and the excess length of communications elements in the conduit generally results from this shrinkage. The conduit 32 is pulled through the cooling trough 41 by a caterpillar 44. The conduit 32 may then pass through an optional caterpillar 45. Conduit 32 passes near a first mark detector 47, which preferably detects marks without contacting the conduit. An optical non-contact mark detector which senses the marks on the conduit 32 by sensing changes in the radiation reflected from the conduit 32 as the marks pass by the mark detector 47 or by sensing magnetic field changes if the mark is magnetic or metallic may be used. If an optical non-contact mark detector is used, the mark detector 47 may sense any convenient radiation, including ultra-violet radiation, reflected from the marks. Finally, the conduit 32 is spooled onto a take-up reel 50.

Figure 2A:
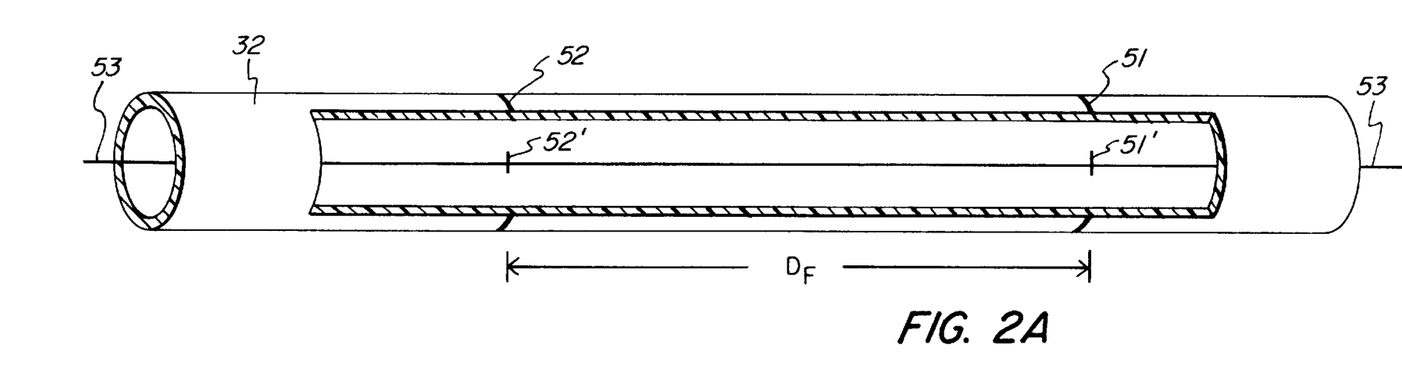
FIG. 2A is a cut-away side view of a buffer tube marked according to the present invention prior to cooling the buffer tube.
Figure 2B:
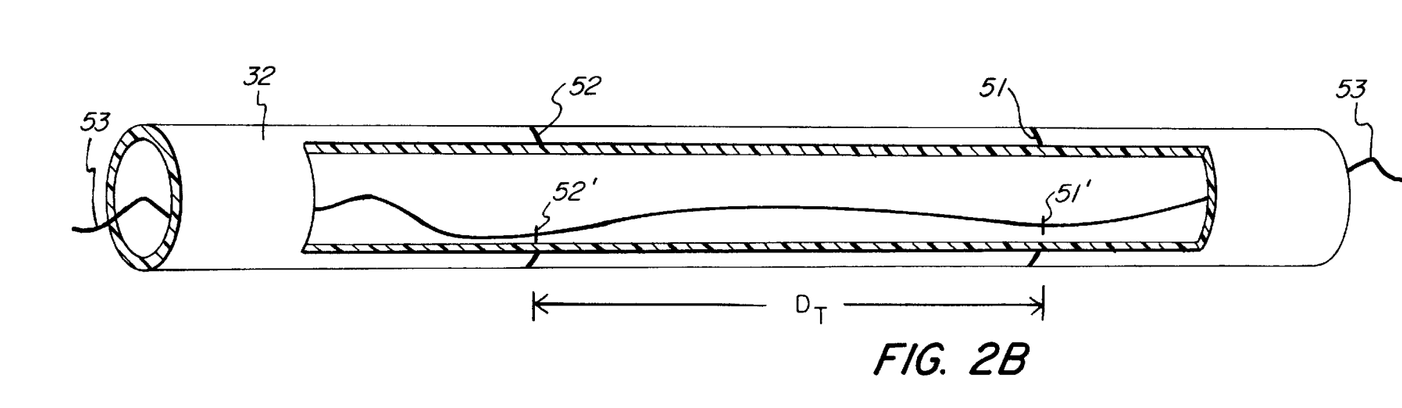
FIG. 2B is a cut-away side view of a buffer tube marked according to the present invention after cooling the buffer tube.

FIG. 2A depicts a conduit 32 after it has been marked according to the present invention but not cooled. In FIG. 2A there is shown an initial mark 51 and a subsequent mark 52 separated by a distance $D_F$. A representative communications element 53 is shown disposed within the conduit 32. Prior to cooling the conduit 32, locations 51' and 52' on the communications element 53 correspond with the marks 51, 52 respectively on the conduit 32 such that the EL Ratio is approximately equal to zero. FIG. 2B depicts the conduit 32 after it has been marked according to the present invention and cooled. After cooling of the conduit 32, the distance $D_T$ on the conduit 32 is less than the distance $D_F$ and the communications element 53 is no longer straight, although location 51' substantially corresponds with mark 51 and location 52' substantially corresponds with mark 52. Once the distance $D_T$ between marks 51,52 is known, the EL Ratio can be calculated because the length $D_F$ of communications element 53 disposed within the conduit 32 between the two locations 51',52' is known. Once the EL Ratio is known, adjustments to the manufacturing process can be made to achieve a desired EL Ratio.

Figure 3:
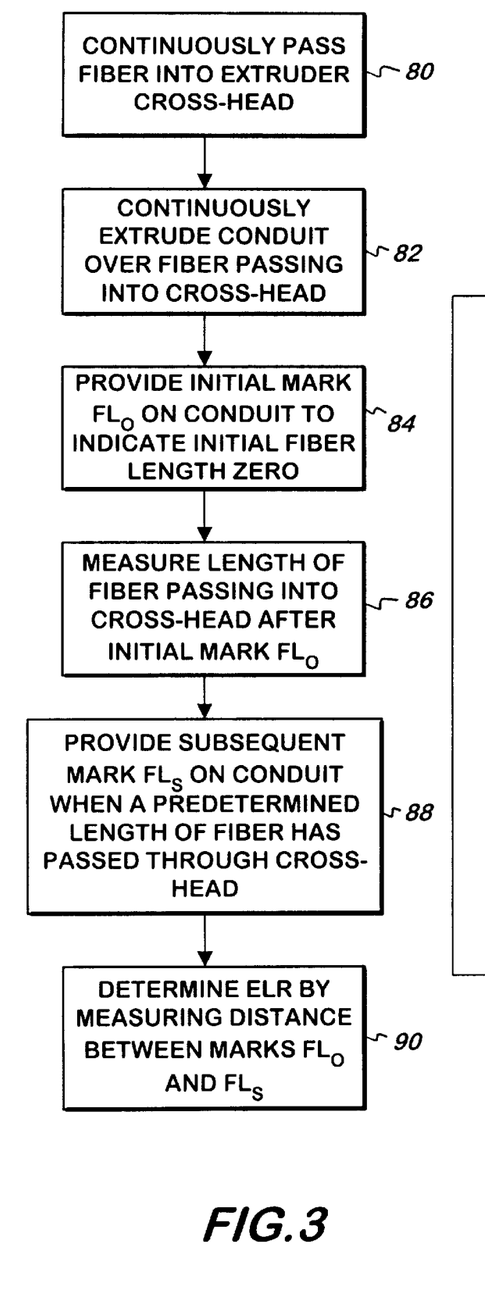
FIG. 3 is a flow chart of a method for determining EL according to the present invention.

In an embodiment of the invention, an operator supplies the conduit line velocity to the controller 40. A signal from an output $47_O$ of the mark detector 47 to the input $39_I$ of controller interface 39 permits the controller 40 to determine the time which elapses between detection of successive marks 51,52 by the mark detector 47. The controller 40 then calculates the distance between successive marks 51,52 by multiplying the line velocity by the time which elapses between detection of the successive marks 51,52. Controller 40 then calculates the EL Ratio and produces a signal for displaying the EL Ratio on a display 54 for use by the line operator in adjusting the apparatus for forming the conduit over the communications elements 20. FIG. 3 depicts the primary steps 80, 82, 84, 86, 88 and 90 of the process described above.

Figure 4:
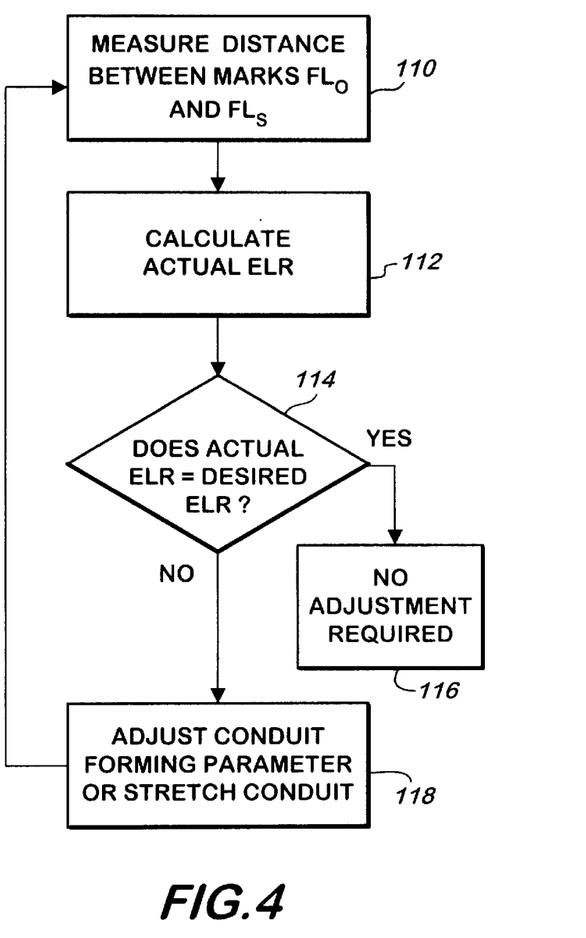
FIG. 4 is a schematic diagram of an apparatus for carrying out another aspect of the present invention for controlling the actual EL Ratio.

As shown in FIG. 1, output $39_O$ of the controller interface 39 may be connected to various components of the apparatus for forming to conduit 32 over the communication elements 20 (e.g., the mixer/measurer input $35_I$, heater input $36_I$, cooling trough input $41_I$ or caterpillar inputs $44_I/45_I$) so that adjustments can be made to the mixer/measurer 35, heater 36, cooling trough 41, or caterpillars 44/45 automatically in order to achieve the desired EL Ratio. For example, the controller 39 could be pre-programmed to send signals via controller interface output $39_O$ to the caterpillar 44 and optional caterpillar 45 in order to adjust the relative speeds of caterpillar 44 and optional caterpillar 45 in order to stretch the conduit 32 between the caterpillars. Alternatively, the controller 40 could send a signal via controller interface output $39_O$ to increase or decrease the rate of cooling by the cooling trough 41 in order to change the degree to which the conduit 32 shrinks. Still further, the temperature or composition of material extruded by extruder cross-head 31 to form the conduit 32 could be adjusted in order to alter the degree of shrinkage of the conduit 32. FIG. 4 depicts the primary steps 110, 112, 114, 116 and 118 of such a process for controlling the EL Ratio.

In an embodiment of the present invention, the bundle sensor 28 senses the velocity of the bundle 24, and sends signals from its output $28_O$ to the input $39_I$ of the controller interface 39 indicating the velocity of the bundle 24. In an embodiment of the present invention, the bundle sensor 28 includes a Doppler laser and transceiver similar to those used in a non-contact length measurement system produced by TSI Incorporated, St. Paul, Minn., bearing model number CB100EFL. In this embodiment, the bundle sensor 28 senses the change in the frequency (Doppler effect) of light directed at the bundle 24 through the use of the Doppler laser and transceiver to send signals to the controller interface 39 indicating the velocity. After initial mark 51 is placed on the conduit 32, the controller 40 counts the length of bundle 24 which has passed the bundle sensor 28 (and therefore, which has been disposed in the conduit 32) since the initial mark's placement on the conduit 32 by multiplying the velocity of the bundle 24 by the time which has elapsed since the placement of the initial mark 51. When the counted length of bundle 24 disposed in the conduit 32 since the placement of the initial mark 51 reaches a predetermined length, the controller 40 via controller interface output $39_O$ instructs marking device 38 to place subsequent mark 52 on the conduit 32. In this fashion, the marks 51,52 are placed so as to indicate that a predetermined length of bundle 24 was disposed in the conduit 32 between the marks 51,52.

The marking device 38 preferably uses an ink-jet or spray to apply the marks 51,52 on the conduit 32. In an embodiment of the invention, the marking device 38 is an ink-jet sprayer similar to that found in many home-computer printers. Alternatively, the marking device 38 may use a laser to effect a change in the color of the conduit 32 where the laser light impinges to create a mark in the conduit 32, as for example by oxidation of a material in the conduit 32. In this manner, only the marking material, or alternatively the laser light, contacts the conduit 32 thereby avoiding substantial physical contact with the conduit 32 that could cause deformities in conduit 32.

Figure 5:
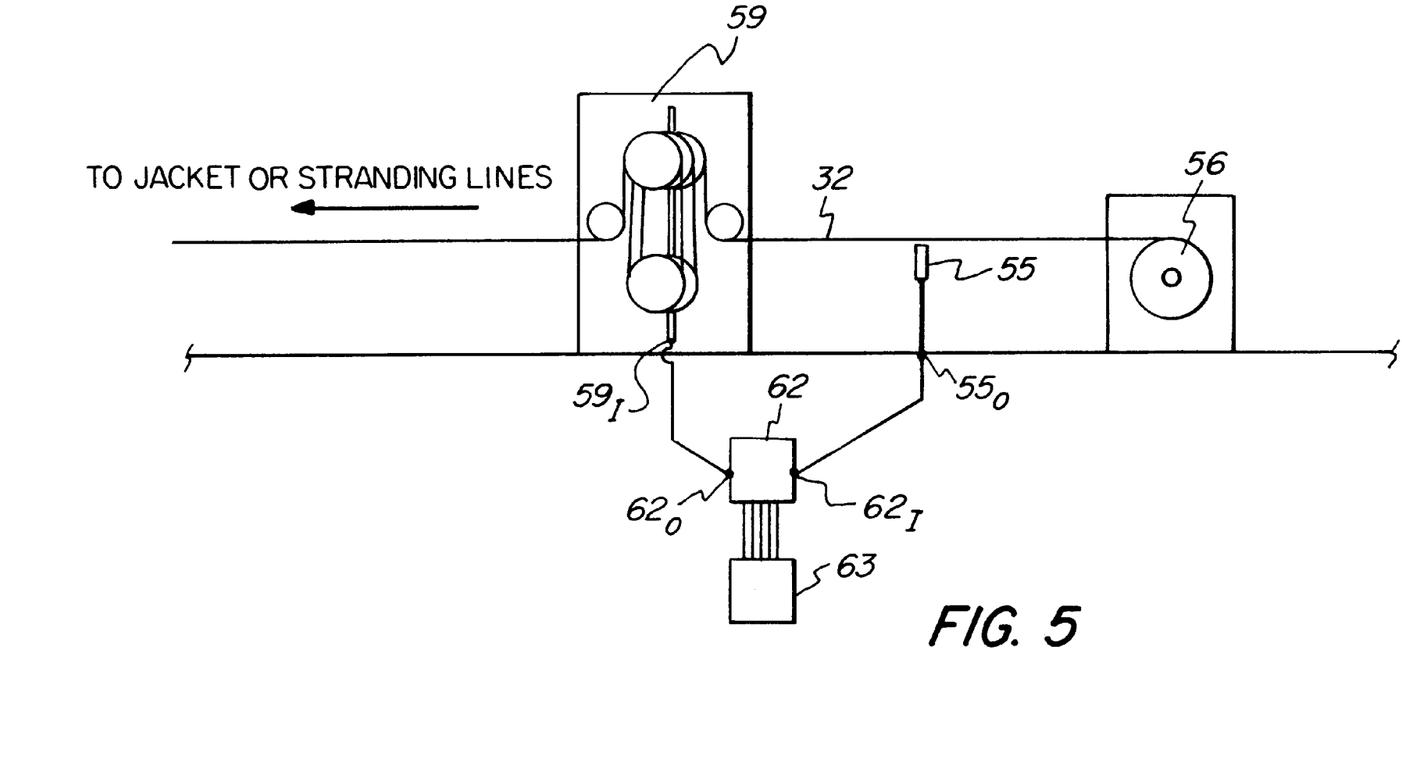
FIG. 5 is a flow chart of a method for controlling EL according to the present invention.

Once the conduit 32 is marked with the initial and subsequent marks, a second mark detector 55 shown in FIG. 5 can be employed in subsequent steps of the manufacturing process. FIG. 5 depicts an embodiment of the present invention in which the conduit 32 (with bundle 24 therein) is removed from a pay-off reel 56 and moves near the second mark detector 55, and finally to a tensioner 59 before proceeding to a subsequent manufacturing step (not shown), such as the jacket or stranding lines. In the embodiment of the invention shown in FIG. 5, an operator supplies the conduit velocity and the length of bundle disposed in the conduit 32 between the successive marks 51,52 to the controller 63. One of the marks 51, 52 will come off the reel 56 first and the other of the marks 51, 52 will come off the reel 56 last. The mark 51 or 52 which comes off first may be referred to as the leading mark and the mark which comes off last may be referred to as the trailing mark. For example, mark 52 is designated as the leading mark and mark 51 is designated as the trailing mark.

The mark detector 55 via output $55_O$ sends signals to an input $62_O$ of controller interface 62 to indicate that a mark 51 or 52 is passing the mark detector 55. Like the mark detector 47, the mark detector 55 preferably detects marks without contacting the conduit, such as the optical non-contact mark detector described above. Using the signals from the mark detector 55, the controller 62 determines the time which elapses between detection of the leading mark 52 and detection of the trailing mark 51, and then calculates the distance between the successive marks 51,52 by multiplying the conduit line velocity by the time which elapsed between detection of the successive marks 51,52. The controller 62 then calculates the EL Ratio using the distance between successive marks 51,52 and the information supplied to the controller 62 regarding the length of bundle disposed in the conduit 32 between successive marks 51,52. After comparing the calculated EL ratio to a desired EL ratio, the controller 62 determines whether tensioning is required to increase the distance between successive marks 51,52 on the conduit 32, and thereby attain the desired EL Ratio. If tensioning of the conduit 32 is required, the controller 62 then sends signals via controller interface output $62_O$ to an input $59_I$ of the tensioner 59 causing the tensioner 59 to place the conduit 32 in tension to stretch the conduit 32 to achieve a desired EL Ratio. FIG. 4 depicts the primary steps 110, 112, 114, 116 and 118 of the process described above.

The method of the present invention allows for quick and accurate measurement of the EL Ratio without destruction of the conduit 32. The present invention also provides a means for determining and controlling variation in EL Ratio down the length of the conduit 32. Furthermore, the EL Ratio is always determinable, even after the conduit leaves the manufacturing facility. The resulting product will therefore have less variation in the EL Ratio, and therefore be more uniform.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A method for determining excess length ratio of a length of communications element disposed in a length of conduit to the length of conduit, the method comprising the steps of:

continuously feeding the communications element through an extruder cross-head;

continuously extruding the conduit over the communications element;

providing an initial mark on the conduit;

counting a length of the communications element fed into the extruder cross-head from the time the initial mark is provided on the conduit;

providing a subsequent mark on the conduit when the counted length of the communications element fed into the extruder cross-head reaches a predetermined value;

measuring a distance between the initial mark and the subsequent mark on the conduit; and determining the excess length ratio of the communications element disposed in the conduit to the length of the conduit by comparing the distance between the initial mark and the subsequent mark on the conduit to the counted length of the communications element fed into the extruder cross-head.

2. The method of claim 1, wherein the step of providing the initial mark and the subsequent mark on the conduit is performed by spraying a marking material on the conduit.

3. The method of claim 1, wherein the step of providing the initial mark and the subsequent mark on the conduit is performed by changing the color of the conduit by exposure to light.

4. The method of claim 1, wherein the step of counting the length of the communications element fed into the extruder cross-head is performed by measuring a velocity of the communications element over a predetermined period of time and multiplying the velocity by the predetermined period of time.

5. The method of claim 1, wherein the step of measuring a distance between the initial mark and the subsequent mark is performed by determining an amount of time which elapses between detecting the initial mark passing a reference point and detecting the subsequent mark passing the reference point, and multiplying the elapsed time by a known conduit velocity.

6. A method for controlling excess length ratio of a communications element disposed in a conduit, comprising:

providing a conduit having a leading mark and a trailing mark, the marks representing that a known length of the communications element was disposed in the conduit between the marks;

measuring a distance between the marks;

determining the actual excess length ratio by comparing the distance between the marks to the known length of the communications element disposed in the conduit between the marks;

comparing the actual excess length ratio to a desired excess length ratio; and stretching the conduit a predetermined amount based upon the measured distance between the marks to increase the length of the conduit relative to the length of the communications element disposed therein to obtain the desired excess length ratio.

7. The method of claim 6, wherein the step of measuring a distance between the leading mark and the trailing mark is performed by determining an amount of time which elapses between detecting the leading mark passing a reference point and detecting the subsequent mark passing the reference point, and multiplying the elapsed time by a known conduit velocity.

8. A method of continuously forming a conduit over a communications element so as to have a desired excess length ratio between the conduit and the communications element, comprising:

forming the conduit over the communications element, the step of forming the conduit further comprises the steps of measuring an amount of a first conduit component material and an amount of a second conduit component material, mixing the measured amounts of the conduit component materials together to form conduit material, heating the conduit material to a predetermined temperature, continuously extruding the heated conduit material over the communications element, and cooling the extruded conduit material at a predetermined rate;

providing an initial mark on the conduit;

providing a subsequent mark on the conduit when a predetermined length of the communications element has been disposed within the conduit from the time the initial mark was provided on the extruded conduit;

measuring a distance between the initial mark and the subsequent mark on the conduit;

determining an actual excess length ratio of the communications element disposed in the conduit to the length of the conduit by comparing the distance between the initial mark and the subsequent mark on the conduit to the predetermined length of the communications element;

comparing the actual excess length ratio to a desired excess length ratio; and adjusting the step of forming the conduit based upon the measured distance between the initial mark and the subsequent mark to obtain the desired excess length ratio.

9. The method of claim 8, wherein the step of adjusting the step of forming the conduit further comprises adjusting the measured amounts of the conduit component materials.

10. The method of claim 8, wherein the step of adjusting the step of forming the conduit further comprises adjusting the predetermined temperature to which the conduit material is heated.

11. The method of claim 8, wherein the step of adjusting the step of forming conduit further comprises adjusting the predetermined rate of cooling the conduit material.

12. An apparatus for determining an excess length ratio of a communications element continuously disposed in a conduit formed by an extruder having a feed side and an exit side and for providing a signal representative of the excess length ratio for displaying the excess length ratio, the apparatus comprising:

a controller interface having an input and an output;

a communications element velocity sensor having an output connected to the input of the controller interface and located at the feed side of the extruder;

a marker having an input connected to the output of the controller interface and located at the exit side of the extruder;

a mark detector having an output connected to the input of the controller interface and located down-line of the marker; and a controller having a processing unit capable of determining the excess length ratio from the velocity sensor input and the mark detector input and capable of providing a signal representative of the excess length ratio so determined.

13. The apparatus of claim 12, wherein the marker is a laser.

14. The apparatus of claim 12, wherein the marker is an ink-jet sprayer.

15. The apparatus of claim 12, wherein the velocity sensor is a Doppler aser.

16. The apparatus of claim 12 wherein the mark detector is an optical mark detector.

17. The apparatus of claim 12 wherein the mark detector is a magnetic mark detector.

18. An apparatus for controlling an actual excess length ratio of a communications element disposed in a conduit having a leading mark and a trailing mark, the apparatus comprising:

a controller interface having an input and an output;

a mark detector having an output connected to the input of the controller interface;

a tensioner having an input connected to the output of the controller interface; and a controller having a processing unit capable of determining the excess length ratio from information supplied to the controller regarding the length of communications element disposed between the leading mark and the trailing mark and the signals sent by the mark detector, being capable of comparing the determined excess length ratio to a desired excess length ratio and further capable of providing a signal to the tensioner via the controller interface to cause the tensioner to put tension on the conduit.

19. The apparatus of claim 18 wherein the mark detector is an optical mark detector.

20. An apparatus for determining excess length ratio of a length of communications element disposed in a length of conduit to the length of conduit, the apparatus comprising:

means for continuously feeding the communications element through an extruder cross-head;

means for continuously extruding conduit material over the communications element to form the conduit;

means for providing an initial mark on the conduit;

means for counting a length of the communications element fed into the extruder cross-head from the time the initial mark is provided on the conduit;

means for providing a subsequent mark on the conduit when the counted length of the communications element fed into the extruder cross-head reaches a predetermined value;

means for measuring a distance between the initial mark and the subsequent mark on the conduit; and means for determining the excess length ratio of the communications element disposed in the conduit to the length of the conduit by comparing the distance between the initial mark and the subsequent mark on the conduit to the counted length of the communications element fed into the extruder cross-head.

21. The apparatus of claim 20, wherein the means for providing the initial mark and the subsequent mark on the conduit is a means for spraying a marking material on the conduit.

22. The apparatus of claim 20, wherein the means for providing the initial mark and the subsequent mark on the conduit is a means for changing the color of the conduit by exposure to light.

23. The apparatus of claim 20, wherein the means for counting the length of the communications element fed into the extruder cross-head includes a Doppler laser and a transceiver.

24. The apparatus of claim 20, wherein the means for measuring a distance between the initial mark and the subsequent mark is comprised of a mark sensor and a central processing unit.

* * * * *

UNITED STATES PATENT AND TRADEMARK OFFICE
CERTIFICATE OF CORRECTION

PATENT NO. : 6,066,275
DATED : May 23, 2000
INVENTOR(S) : Richard T. Robinson, et. al.

It is certified that error appears in the above-indentified patent and that said Letters Patent is hereby corrected as shown below:

In column 9, line 11 (claim 15, line 2), "aser" should be --laser--.

Signed and Sealed this

Twentieth Day of March, 2001

Attest:

NICHOLAS P. GODICI

Attesting Officer

Acting Director of the United States Patent and Trademark Office